3,560,153
CONVERSION OF ILMENITE TO RUTILE UTILIZING SULFUR DIOXIDE

Nevin K. Hiester, Portola Valley, Calif., assignor to Bechtel International Corporation
No Drawing. Filed Feb. 27, 1969, Ser. No. 803,109
Int. Cl. C01g 23/04
U.S. Cl. 23—202       2 Claims

ABSTRACT OF THE DISCLOSURE

Ilmenite is converted to rutile by heating the ilmenite in the presence of sulfur dioxide and a reductant to sulfidize the iron content followed by leaching of the sulfidized ilmenite with sulfurous acid. In a subsequent roasting step, sulfur dioxide is released which can be recycled to the sulfidizing step.

SUMMARY OF THE INVENTION

One of the most inexpensive and most common ores containing titanium is ilmenite and many processes have been proposed for the conversion of ilmenite to rutile which is a much more expensive mineral and one which lends itself to industrial use, either as such or as a source for titanium metal. Most of the processes proposed include a sulfidizing step wherein the iron content of the ilmenite is converted to the sulfide while the titanium is left in the oxide form. After such a conversion the iron sulfide can be leached out leaving substantially pure rutile.

Most reagents which have been proposed in the past have been relatively expensive, toxic, and corrosive. In accordance with the present invention it has been found that sulfur dioxide in the presence of a reductant lends itself to the rapid and inexpensive conversion of the ilmenite to the form in which the iron is converted into the sulfide. Further, in accordance with the invention it has been found that sulfurous acid, i.e. a solution of sulfur dioxide in water, is a suitable reagent for leaching the iron sulfide, leaving the titanium dioxide behind. During the conversion step, elemental sulfur is deposited, but this can be readily converted by a simple roasting step to sulfur dioxide which can be returned to the process. Further, the leached iron solution can be readily oxidized to recover hematite which is itself a valuable material, and to release further sulfur dioxide which can be recycled back to either the sulfidizing or the leaching steps. Thus, the process of the present invention is a completely cyclic process wherein the sulfur dioxide is constantly regenerated and returned to the process and ilmenite is converted to rutile and hematite.

The process of the present invention consists of the following steps.

Step I

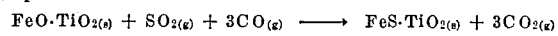

Step II

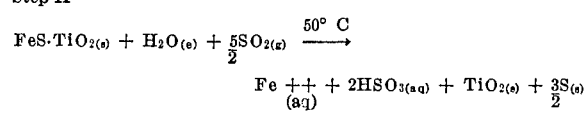

Step III

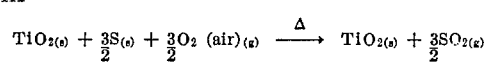

Step IV

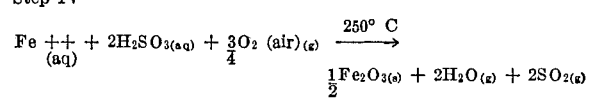

In step I, gaseous sulfur dioxide is reacted in the presence of carbon monoxide with ilmenite to form ferrous sulfide, leaving the titanium dioxide unchanged. Some elemental sulfur is formed, but it will condense on the sulfidized ilmenite in the cool portion of the furnace. Step II consists of dissolving the reaction mass from step I with sulfurous acid made by passing sulfur dioxide into water. The titanium dioxide is unattacked, whereas the iron sulfide goes into solution as ferrous bisulfite. The sulfurous acid also reacts with the hydrogen sulfide liberated and forms additional elemental sulfur, over that brought in from step I, by the well known Claus reaction. The bubbling of air through the leach solution, if necessary, assures the complete conversion of any remaining hydrogen sulfide to sulfur. The residue from this reaction is relatively pure rutile plus elemental sulfur. This reaction is thermodynamically favorable at normal leaching temperatures. Roasting of the residue as shown in step III converts the sulfur to sulfur dioxide which is recycled to steps I and II. In step IV, the filtrate is oxidized and thermally decomposed, after evaporation, to sulfur dioxide and ferric oxide. The sulfur dioxide is recycled to steps I and II as required, and the high-grade ferric oxide is a valuable byproduct. This decomposition goes at 250° C.

As will appear later, carbon monoxide is a preferred reductant since it gives the highest degree of conversion of any reductants found. This is probably because it is highly reaction and in gaseous form.

DESCRIPTION OF THE PREFERRED EMBODIMENTS

Example I

A boat in a tube furnace was loaded with two grams of ilmenite. The ilmenite was −60+80 mesh containing 23.4% of iron. The tube was heated to a temperature of 800° C. and purged with argon. A mixture of carbon monoxide and sulfur dioxide was then passed through the tube at a rate of 40 cc. per minute. The mixture contained 30 parts by volume of carbon monoxide and 10 parts per volume of sulfur dioxide. Flow was continued for a period of 1 hour at substantially atmospheric pressure. At the end of 1 hour the tube was purged again with argon and the contents removed. The residue was largely fused an weighed 2.0746 grams. It was found that 90% of the iron had been converted to the sulfide form. The material was then ground to 80 mesh and leached at 50° C. in an aqueous solution in which sulfur dioxide was bubbled. After 90 minutes, 96% of the fereous sulfide in the converted ilmenite had been leached out. Some of the sulfur dioxide reacted with the sulfide ion to form elemental sulfur. The solid residue, which was substantially titanium dioxide with some free sulfur, was then roasted in air at a temperature of 80° C. This converted the elemental sulfur left in the sample to sulfur dioxide, freeing the titanium dioxide as one of the final products. The sulfur dioxide could be returned to either the sulfidizing or leaching steps.

The ferrous bisulfite solution which was left was then heated in the presence of air to 250° C. This converted the iron to hematite and released further sulfur dioxide for recycle to the process.

EXAMPLE II

The equipment used was that described in Example I and the boat was filled with 1.7 grams of ilmenite and 0.31 gram of finely divided carbon. The tube was heated and purged as before and sulfur dioxide under a pressure of 1 atmosphere and at a rate of 10 cc. per minute was passed through the tube. After 1 hour, the tube was again purged and the sample ground and leached as before. It was found that there was a conversion of 41% of the iron to the sulfide form.

EXAMPLE III

The boat of Example I was loaded with two grams of ilmenite, heated and purged as before. Thereupon a mixture of methane and sulfur dioxide in equal volumes was passed through the vessel at a flow rate of 20 cc. per minute. This was continued for 1 hour and at the end of this time the sample analyzed and it was found that 57% of the iron had been converted to the sulfide form.

I claim:

1. A cyclic process for converting ilmenite to rutile titanium dioxide comprising the steps of:
   (a) passing a gaseous stream consisting of a mixture of sulfur dioxide and a gaseous reductant of the group consisting of carbon monoxide and methane through a mass of finely divided ilmenite maintained at a temperature of about 800° C., the sulfur dioxide and the reductant contents of the gas stream being sufficient to substantially convert all of the iron oxide content of the ilmenite to ferrous sulfide but leaving the titanium dioxide unchanged;
   (b) contacting the reaction mass thus produced with an aqueous solution of sulfurous acid, whereby the iron sulfide is dissolved into the solution as ferrous bisulfite, elemental sulfur is produced and the solid titanium dioxide being unattacked by said sulphurous acid;
   (c) filtering the aqueous solution to separate the sulfur and titanium dioxide therefrom and provide a filtrate containing said ferrous bisulfite;
   (d) roasting the mixture of titanium dioxide and sulfur in air at a temperature of 80° C. to convert the elemental sulfur to sulfur dioxide and freeing the solid titanium dioxide;
   (e) recycling the sulfur dioxide to step (a).

2. A process as defined in claim 1 wherein the filtrate containing the ferrous bisulfite is heated in the presence of air to 250° C. to produce iron oxide and releasing further sulfur dioxide for recycling into the process.

References Cited

UNITED STATES PATENTS

| 1,206,797 | 12/1916 | Barton | 23—202 |
| 1,738,765 | 12/1929 | Doerinckel et al. | 23—202 |
| 2,127,247 | 8/1938 | Dawson et al. | 23—202 |
| 2,231,181 | 2/1941 | Brooks | 23—126 |
| 3,018,170 | 1/1962 | Soloducha | 23—202X |

FOREIGN PATENTS

| 597,064 | 4/1960 | Canada | 23—202 |

EDWARD STERN, Primary Examiner

U.S. Cl. X.R.

23—130, 134, 177, 200, 224